US012712458B2

(12) United States Patent
Chen

(10) Patent No.: US 12,712,458 B2
(45) Date of Patent: Aug. 18, 2026

(54) CONTROLLER OF AN AUXILIARY SWITCH USED IN A FLYBACK CIRCUIT AND CONTROL METHOD THEREOF

(71) Applicant: Hangzhou MPS Semiconductor Technology, Ltd., Hangzhou (CN)

(72) Inventor: Xuefeng Chen, Hangzhou (CN)

(73) Assignee: Hangzhou MPS Semiconductor Technology, Ltd., Hangzhou (CN)

(*) Notice: Subject to any disclaimer, the term of this patent is extended or adjusted under 35 U.S.C. 154(b) by 246 days.

(21) Appl. No.: 18/595,738

(22) Filed: Mar. 5, 2024

(65) Prior Publication Data

US 2024/0305204 A1 Sep. 12, 2024

(30) Foreign Application Priority Data

Mar. 7, 2023 (CN) ........................ 202310241428.4

(51) Int. Cl.

| | |
|---|---|
| ***H02M 1/00*** | (2007.01) |
| ***H02M 1/08*** | (2006.01) |
| ***H02M 1/088*** | (2006.01) |
| ***H02M 3/335*** | (2006.01) |

(52) U.S. Cl.
CPC ..... *H02M 3/33515* (2013.01); *H02M 1/0009* (2021.05); *H02M 1/088* (2013.01); *H02M 3/33523* (2013.01)

(58) Field of Classification Search
CPC ......... H02M 3/33507; H02M 3/33517; H02M 3/33576; H02M 1/0009; H02M 1/0006; H02M 1/342
See application file for complete search history.

(56) References Cited

U.S. PATENT DOCUMENTS

| | | | | |
|---|---|---|---|---|
| 11,031,876 | B1 | 6/2021 | Li | |
| 11,387,740 | B1 | 7/2022 | Li | |
| 2021/0091672 | A1* | 3/2021 | Lin | H02M 3/33523 |
| 2024/0305204 | A1* | 9/2024 | Chen | H02M 3/33515 |
| 2025/0202368 | A1* | 6/2025 | Chen | H02M 3/33592 |
| 2025/0247008 | A1* | 7/2025 | Yang | H02M 3/28 |

FOREIGN PATENT DOCUMENTS

| | | | | |
|---|---|---|---|---|
| CN | 118920882 | A * | 11/2024 | H02M 1/0003 |

* cited by examiner

*Primary Examiner* — Sisay G Tiku
(74) *Attorney, Agent, or Firm* — Ashurst Perkins Coie US LLP

(57) ABSTRACT

A controller for controlling auxiliary switch connected in series with a clamp capacitor to form an energy recycle branch in a flyback circuit. The controller has a power supply terminal to receive an external supply voltage, a sensing terminal connected to a first terminal of a current sense resistor which is connected in series with a primary switch, a ground terminal connected to a second terminal of the current sense resistor, a drive terminal connected to a control terminal of the auxiliary switch, and a turn on control circuit. Based on a logic state of a voltage at the power supply terminal and a voltage across the current sense resistor, the turn on control circuit provides a turn on control signal to control of the auxiliary switch.

17 Claims, 9 Drawing Sheets

Detect a logic state of the voltage at the power supply terminal

6051

Provide a trigger signal with a first level when a duration of the voltage at the power supply terminal signal being logic high is longer than a predetermined period

6052

Provide a sensing signal representative of the voltage across the current sense resistor

6053

When the trigger signal is at the first level and the sensing signal is lower than a first threshold voltage, provide an enable signal with a first level

6054

When the enable signal is at the first level, the auxiliary switch is allowed to be turned on when a falling-edge of the voltage at the power supply terminal comes

6055

When the sensing signal is increased to a second threshold voltage, provide a reset signal with an turn on enable window

6056

If the falling-edge of the voltage at the power supply terminal is not shown within the enable window, the enable signal is switched to a second level from the first level

6057

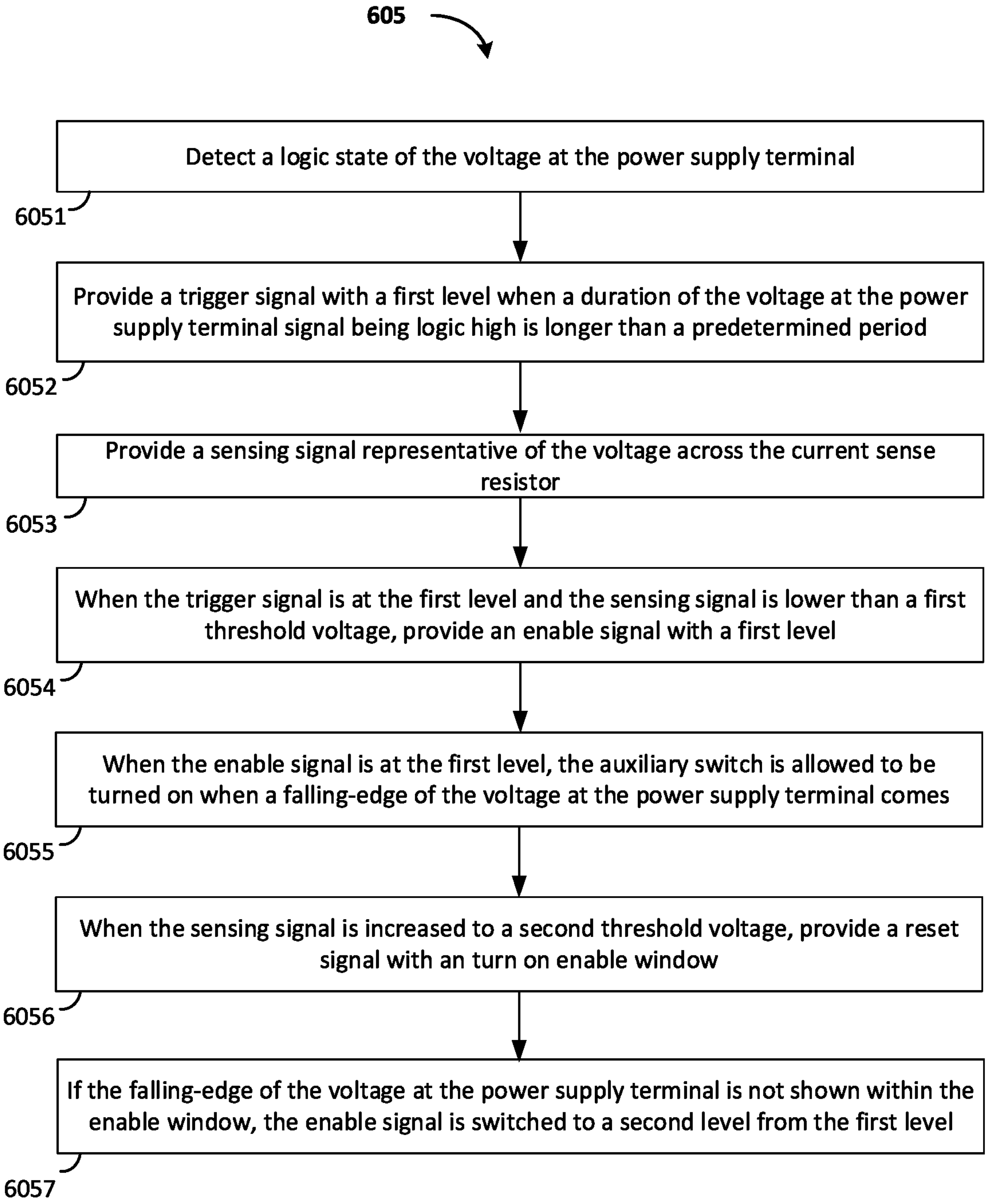

FIG. 10

CONTROLLER OF AN AUXILIARY SWITCH USED IN A FLYBACK CIRCUIT AND CONTROL METHOD THEREOF

CROSS-REFERENCE TO RELATED APPLICATIONS

This application claims the benefit of CN application 202310241428.4, filed on Mar. 7, 2023, and incorporated herein by reference.

TECHNICAL FIELD OF THE INVENTION

The present invention generally relates to electronic circuits, and more particularly but not exclusively, to a controller of an auxiliary switch used in a flyback circuit and associated control methods.

BACKGROUND OF THE INVENTION

FIG. 1 shows a conventional RCD snubber 11 for a flyback circuit 100. The RCD snubber 11 comprises a clamp capacitor Csn, a snubber resistor Rsn and a diode Dsn. When a primary control signal GP provided by a primary control circuit 10 turns OFF a primary switch MP coupled to a primary winding Np, a leakage inductance Lk of a transformer T transfer its leakage inductance energy to charge the clamp capacitor Csn via the diode Dsn. After charging process of the clamp capacitor Csn is over, the energy stored in the clamp capacitor Csn is consumed by the snubber resistor Rsn. Although voltage spikes of the flyback circuit 100 may be well suppressed, efficiency is limited for the leakage inductance energy is just burned out instead of being recycled.

SUMMARY OF THE INVENTION

An embodiment of the present invention discloses controller for controlling an auxiliary switch connected in series with a clamp capacitor to form an energy recycle branch in a flyback circuit. The controller comprises a power supply terminal, a sensing terminal, a ground terminal, a drive terminal, and a turn on control circuit. The power supply terminal is configured to receive an external supply voltage. The sensing terminal is configured to be coupled to a first terminal of a current sense resistor which is connected in series with a primary switch. The ground terminal is configured to be coupled to a second terminal of the current sense resistor. The drive terminal is coupled to a control terminal of the auxiliary switch. The turn on control circuit is coupled to the power supply terminal and the sensing terminal, wherein based on a logic state of the voltage at the power supply terminal and a voltage across the current sense resistor, the turn on control circuit is configured to provide a turn on control signal to the drive terminal, to control the turning-on of the auxiliary switch.

Another embodiment of the present invention discloses a flyback circuit. The flyback circuit comprises a primary switch, an auxiliary switch and a controller. The primary switch is coupled to a primary winding of a transformer via a current sense resistor. The auxiliary switch is coupled in series with a clamp capacitor to form an energy recycle branch. The controller comprises a power supply terminal, a sensing terminal, a ground terminal, a drive terminal and a turn on control circuit. The power supply terminal is configured to receive an external supply voltage. The sensing terminal is configured to be coupled to a first terminal of a current sense resistor. The ground terminal is configured to be coupled to a second terminal of the current sense resistor. The drive terminal is configured to be coupled to a control terminal of the auxiliary switch. The turn on control circuit is coupled to the power supply terminal and the sensing terminal, based on a logic state of a voltage at the power supply terminal and a voltage across the current sense resister, the turn on control circuit is configured to provide a turn on control signal to control the turning-on of the auxiliary switch.

Yet another embodiment of the present invention discloses control method for controlling an auxiliary switch connected in series with a clamp capacitor to form an energy recycle branch in a flyback circuit. The control method comprises the flowing steps. An external supply voltage is received at a power supply terminal of a controller. A sensing terminal of the controller is coupled to a first terminal of the current sense resistor. A ground terminal of the controller is coupled to a second terminal of the current sense resistor. A drive terminal of the controller is coupled to a control terminal of the auxiliary switch. Based on a logic state of a voltage at the power supply terminal and a voltage across the current sense resistor, whether to turn on the auxiliary switch is determined.

BRIEF DESCRIPTION OF DRAWINGS

The present invention can be further understood with reference to the following detailed description and the appended drawings, wherein like elements are provided with like reference numerals.

FIG. 10 shows a flow diagram of a method 605 for providing a turn on control signal in accordance with an embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to “one embodiment”, “an embodiment”, “an example” or “examples” means: certain features, structures, or characteristics are contained in at least one embodiment of the present invention. These “one embodiment”, “an embodiment”, “an example” and “examples” are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as “connected” or “coupled” to another element, it can be directly connected or coupled to the other element, or there could exist one or more intermediate elements. In contrast, when an element is referred to as “directly connected” or “directly coupled” to another element, there is no intermediate element.

Figure 1:
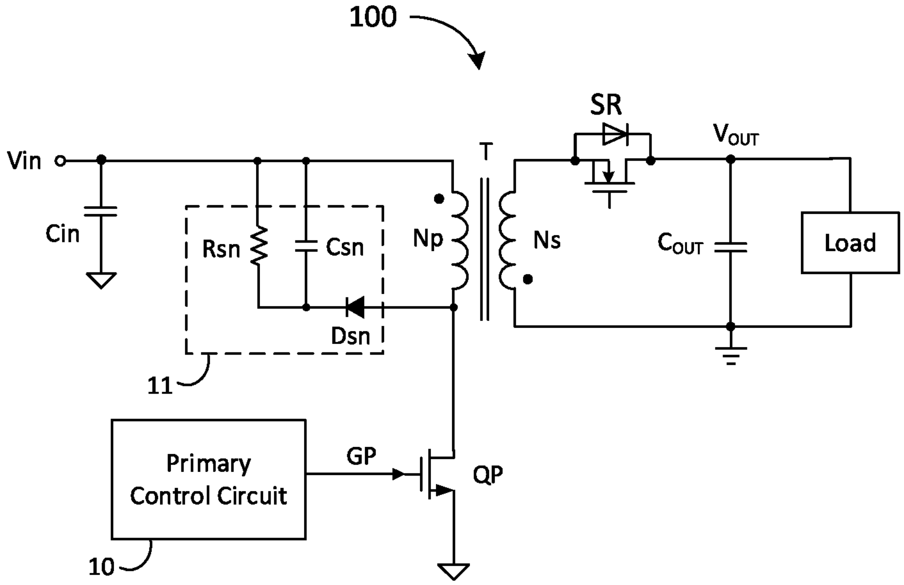
FIG. 1 shows a conventional RCD snubber 11 for a flyback circuit 100.
Figure 2:
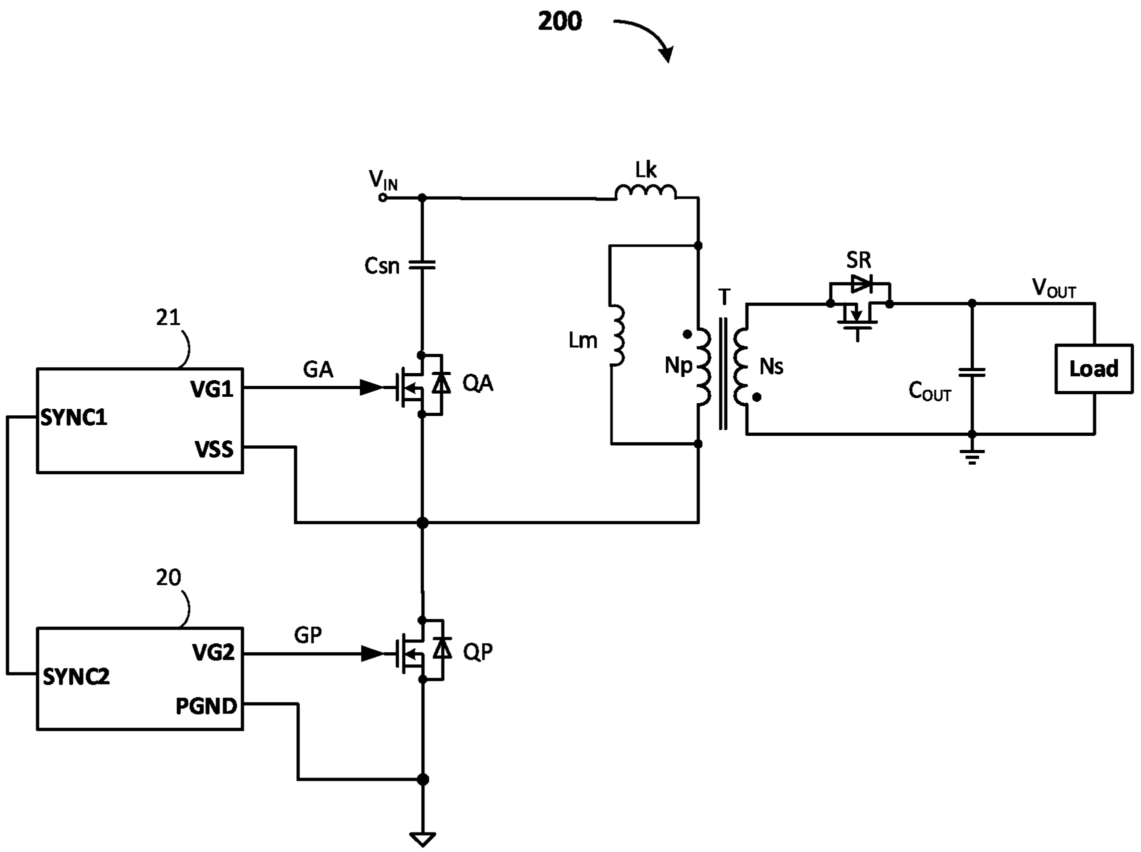
FIG. 2 shows a flyback circuit 200 having an auxiliary switch.

FIG. 2 shows a flyback circuit 200 having an auxiliary switch. As shown in FIG. 2, the flyback circuit 200 comprises an auxiliary switch QA and a primary switch QP. The auxiliary switch QA is coupled to an input power supply to receive an input voltage Vin. The primary switch QP is coupled between the auxiliary switch QA and a primary ground PGND. When the primary switch QP is turned on, the auxiliary switch QA is turned off and remains off state. A current flows through a primary winding Np of a transformer T and the primary switch QP, to the primary ground PGND, and the energy is then stored in the leakage inductance Lk of the transformer T. Once the primary switch QP is in the off state, the leakage inductance Lk of the transformer T charges the clamp capacitor Csn through a body diode of the auxiliary switch QA, so that the leakage inductance energy is transferred and stored in the clamp capacitor Csn. Then the auxiliary switch QA is turned on. The energy stored in the clamp capacitor Csn is not consumed, but being recycled through the auxiliary switch QA and the transformer T. The auxiliary switch QA provides a bidirectional current path that can help recycle the energy dissipated in the RCD snubber circuit 11 shown in FIG. 1, and fully releases the recycled energy to an output of the secondary side, thereby improving the efficiency of the flyback circuit 200.

The auxiliary switch QA and the primary switch QP are controlled by a controller 21 and a primary control circuit 20 respectively. When the controller 21 is working, it needs to determine whether the primary switch QP is in the off state, so as to avoid the simultaneous conduction of the auxiliary switch QA and the primary switch QP, or to prevent the auxiliary switch QA from being mis-triggered. Additional pins and/or circuits (such as the synchronous pin SYNC1 of the controller 21 and the synchronous pin SYNC2 of the primary control circuit 20 shown in FIG. 2) are often required to realize the synchronous communication between the controller 21 and the primary control circuit 20, and judge whether the primary switch QP is in on state or off state. Undoubtedly, this adds complexity and cost of the design. In addition, the controller 21 and the primary control circuit 20 have different power reference grounds, for example, the reference ground pin VSS of the controller 21 is coupled to the common switch node of the auxiliary switch QA and the primary switch QP. In practical applications, after the primary switch QP is turned off, the reference ground VSS of the controller 21 may be affected by a voltage oscillation in discontinuous current mode, and even trigger an auxiliary control signal GA of the auxiliary switch QA by mistake. Therefore, the auxiliary switch QA has a risk of being mis-triggered.

Figure 3:
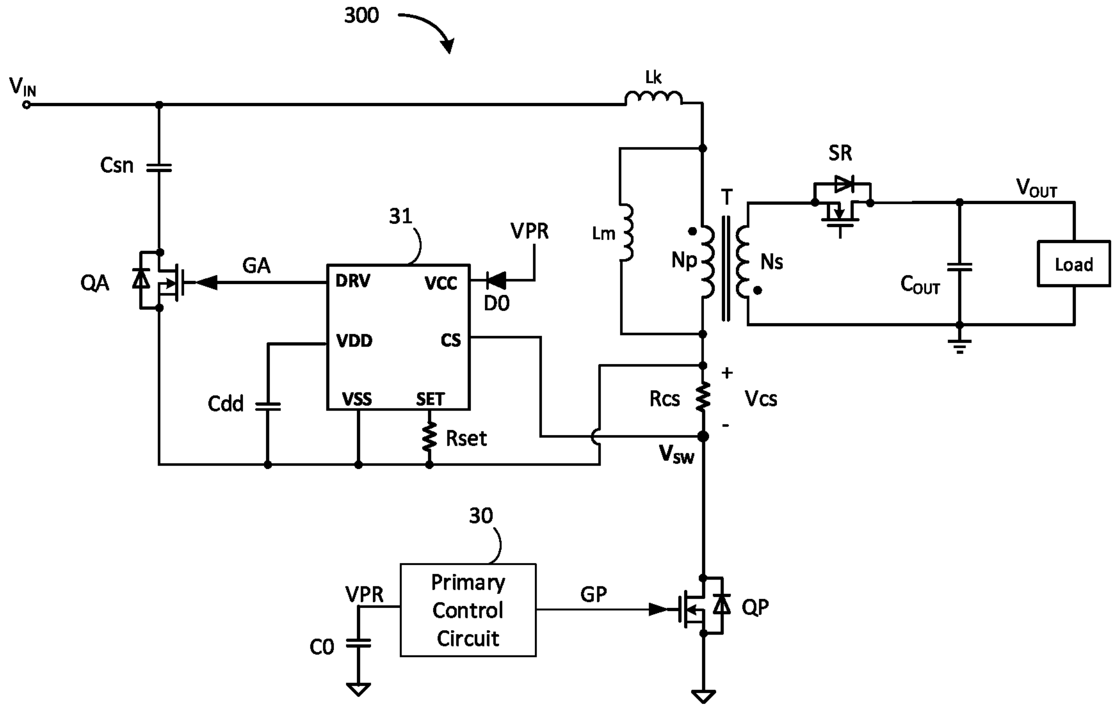
FIG. 3 shows a circuit diagram of a flyback circuit 300 in accordance with an embodiment of the present invention.

In order to solve the problems mentioned above, a novel controller of an auxiliary switch used in a flyback circuit is proposed. FIG. 3 shows a circuit diagram of a flyback circuit 300 in accordance with an embodiment of the present invention. As shown in FIG. 3, the flyback circuit 300 comprises a transformer T having a primary winding Np and a secondary winding Ns. The auxiliary switch QA is coupled in series with a clamp capacitor Csn to form an energy recycle branch. The energy recycle branch is connected in parallel with the primary winding Np of the flyback circuit 300. The primary switch QP is coupled to the primary winding Np through a current sense resistor Rcs. A primary control circuit 10 has a power supply terminal for receiving a primary power supply voltage VPR, a drive terminal for providing a primary control signal GP to the primary switch QP, and a ground terminal. In one embodiment, the primary power supply voltage VPR is a voltage generated by charging a capacitor C0 through an auxiliary winding of the transformer T and a diode.

The controller 31 comprises a plurality of terminals. In the embodiment shown in FIG. 3, the plurality of terminals comprises: a power supply terminal VCC for receiving an external input power supply voltage, a sensing terminal CS coupled to a first terminal of the current sense resistor Rcs, a ground terminal VSS coupled to a second terminal of the current sense resistor Rcs, and a drive terminal DRV coupled to a control terminal of the auxiliary switch QA to provide an auxiliary control signal GA. The power supply terminal VCC is configured to receive the primary power supply voltage VPR through a diode DO. In one embodiment, the controller 31 further comprises a turn on control circuit. The turn on control circuit is coupled to the power supply terminal VCC and the sensing terminal CS. Based on the logic state of the voltage $V_{CC\text{-}SS}$ at the power supply terminal VCC and a voltage Vcs across the current sense resistor Rcs, the turn on control circuit generates a turn on control signal S_ON to control the turning-on of the auxiliary switch QA.

In one embodiment, the controller 31 further comprises a setting terminal SET and an ON-time control circuit. The ON-time control circuit is coupled to an external resistor Rset through the setting terminal SET and is configured to limit a maximum ON-time of the auxiliary switch QA in accordance with the resistance of the external resistor Rset.

In the embodiment shown in FIG. 3, the controller 31 further comprises a voltage regulating terminal VDD coupled to an external capacitor Cdd and an internal voltage regulator. The internal voltage regulator is coupled between the power supply terminal VCC and the voltage regulating terminal VDD. The internal voltage regulator is configured to convert the voltage $V_{CC\text{-}SS}$ at the power supply terminal VCC into a lower internal power supply voltage Vs. This voltage Vs is utilized to provide power supply to other internal circuits of the controller 31, such as logic circuits. In one embodiment, the internal voltage regulator comprises a linear regulator.

Figure 4:
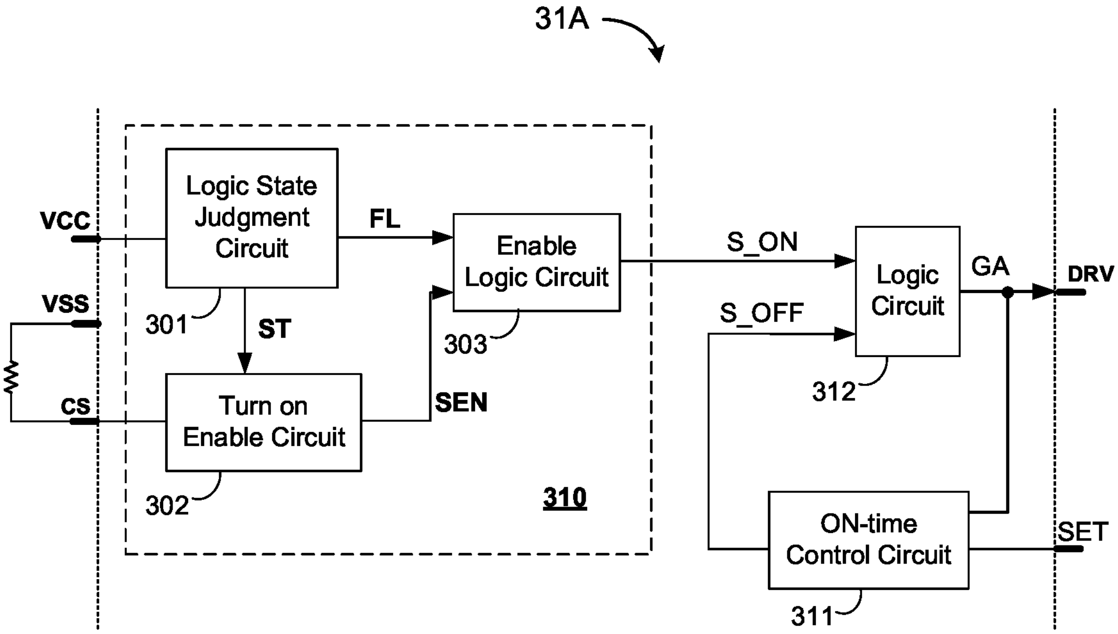
FIG. 4 shows a circuit diagram of a controller 31A of an auxiliary switch in accordance with an embodiment of the present invention.

FIG. 4 shows a circuit diagram of a controller 31A of an auxiliary switch in accordance with an embodiment of the present invention. As shown in FIG. 4, the controller 31A comprises a turn on control circuit 310, an ON-time control circuit 311 and a logic circuit 312. In the embodiment shown in FIG. 4, the turn on control circuit 310 comprises a logic state judgement circuit 301, a turn on enable circuit 302 and an enable logic circuit 303.

In the embodiment shown in FIG. 4, the logic state judgement circuit 301 is coupled to the power supply terminal VCC to receive the voltage $V_{CC\text{-}SS}$. When the duration the voltage $V_{CC\text{-}SS}$ being a logic high level is longer than a first pre-determined period Tblank, the logic state judgement circuit 301 provides a trigger signal ST with a first level at a first output terminal. In one embodiment, the first level of the trigger signal ST is logic high level. The logic state judgement circuit 301 is also configured to provide a falling-edge trigger signal FL when the falling-edge of the voltage $V_{CC\text{-}SS}$ at the power supply terminal VCC comes.

The turn on enable circuit 302 is coupled to the sensing terminal CS to receive a sensing signal V1 representative of the voltage Vcs across the current sense resistor Rcs. When the trigger signal ST is at the first level and the sensing signal V1 is decreased to a first threshold voltage $V_{TH1\text{-}Hys}$, the turn on enable circuit 302 is configured to provide an enable signal SEN having a first level. In one embodiment, the first threshold voltage $V_{TH1\text{-}Hys}$ is −50 mV. In one embodiment, the first level of the enable signal SEN is logic high level.

The enable logic circuit 303 is configured to allow the auxiliary switch QA to be turned on when the enable signal SEN is being the first level and a falling-edge of the voltage $V_{CC\text{-}SS}$ at the power supply terminal VCC comes. In the embodiment shown in FIG. 3, the enable logic circuit 303 is configured to receive the falling-edge trigger signal FL and the trigger signal ST, to provide a turn on control signal S_ON at an output terminal.

In a further embodiment, when the sensing signal V1 is increased to a second threshold voltage VTH1, the turn on enable circuit 302 is configured to provide a reset signal R0 having a turn on enable window Tw. Wherein if the falling-edge of the voltage $V_{CC\text{-}SS}$ at the power supply terminal VCC shows within the turn on enable window Tw, the auxiliary switch QA is turned on after a dead time. And if the falling-edge of the voltage $V_{CC\text{-}SS}$ at the power supply terminal VCC is not shown within the turn on enable window Tw, the enable signal SEN is switched from the first level to a second level, e.g., from logic high level to the logic low level. In one embodiment, the second threshold voltage $V_{TH1}$ is-25 mV.

As shown in FIG. 4, the ON-time control circuit 311 is coupled to the setting terminal SET and the drive terminal DRV and is configured to provide the ON-time control signal S_OFF at an output terminal to limit the maximum ON-time of the auxiliary switch QA by adjusting the resistance of the external resistor Rset.

The logic circuit 312 has a first input terminal, a second input terminal and an output terminal, wherein the first input terminal is coupled to the output terminal of the turn on control circuit 310 to receive the turn on control signal S_ON, and the second input terminal is coupled to the output terminal of the ON-time control circuit 311 to receive the ON-time control signal S_OFF. Based on the turn on control signal S_ON and the ON-time control signal S_OFF, the logic circuit 312 is configured to provide an auxiliary control signal GA at the output terminal to the drive terminal DRV to control the turning-on and turning-off of the auxiliary switch QA.

Figure 5:
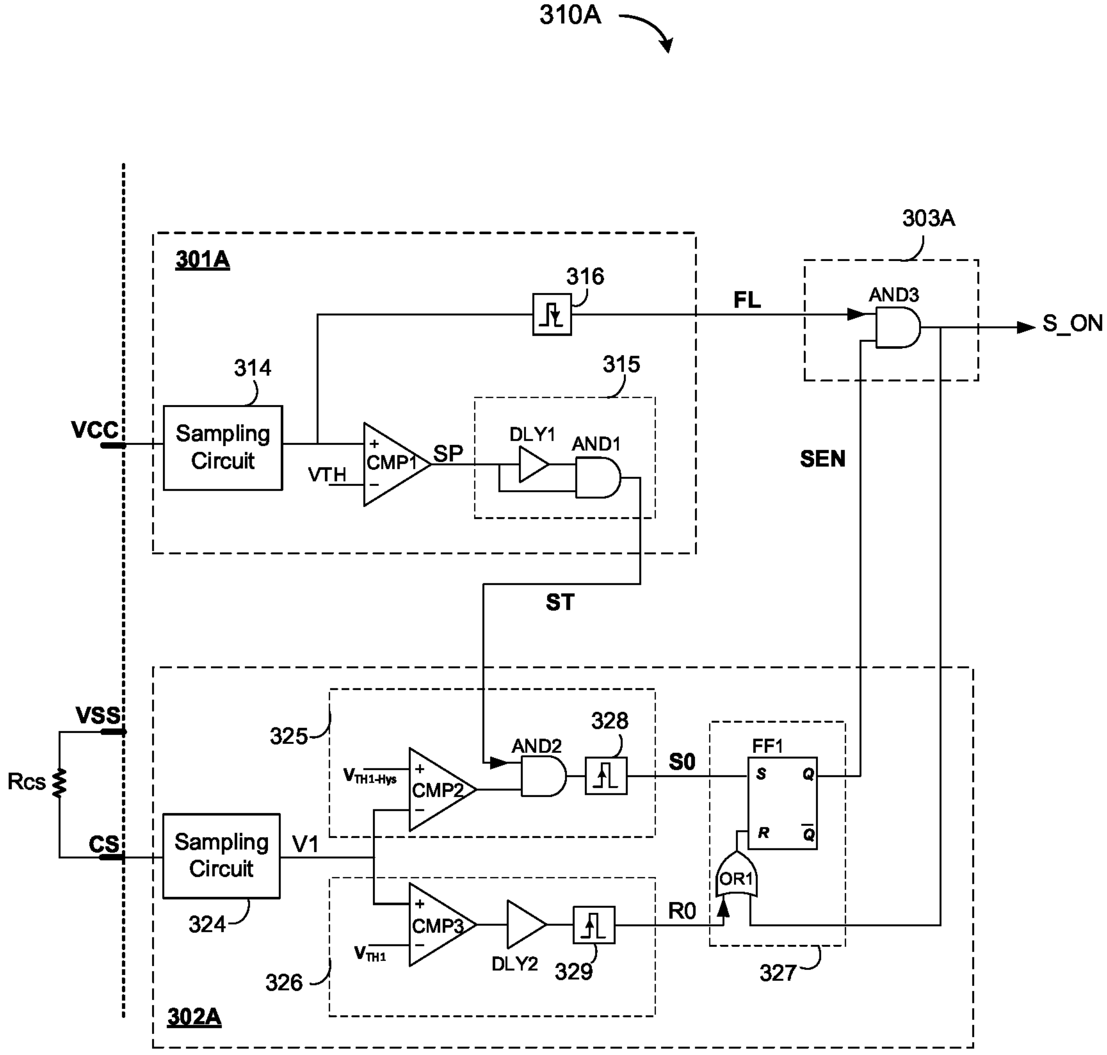
FIG. 5 shows a circuit diagram of a turn on control circuit 310A in accordance with an embodiment of the present invention.

FIG. 5 shows a circuit diagram of a turn on control circuit 310A in accordance with an embodiment of the present invention. In the embodiment shown in FIG. 5, the turn on control circuit 310A comprises a logic state judgement circuit 301A, a turn on enable circuit 302A and an enable logic circuit 303A.

As shown in FIG. 5, the logic state judgement circuit 301A comprises a sampling circuit 314, a comparator CMP1, a leading-edge blanking circuit 315 and a falling-edge trigger circuit 316. In the embodiment shown in FIG. 5, the sampling circuit 314 has an input terminal and an output terminal, wherein the input terminal is coupled to the power supply terminal VCC, and the output terminal is configured to provide the voltage $V_{CC\text{-}SS}$. The non-inverting input terminal of the comparator CMP1 is configured to receive the voltage $V_{CC\text{-}SS}$, the inverting input terminal is configured to receive a threshold voltage $V_{TH}$. The comparator CMP1 is configured to compare the voltage $V_{CC\text{-}SS}$ with the threshold voltage $V_{TH}$, to provide a comparison signal SP at the output terminal.

The leading-edge blanking circuit 315 is configured to blank the pulse leading-edge of the comparison signal SP for a preset time period Tblank, and then provide the trigger signal ST at the output terminal, so as to suppress the current spike caused when the primary switch QP is turned on. In one embodiment, when the pulse width of the comparison signal SP is greater than the preset time period Tblank, the leading-edge blanking circuit 315 is configured to output the rest part of the comparison signal SP after the preset time period Tblank as the trigger signal ST. When the pulse width of the comparison signal SP is less than the preset time period Tblank, the leading-edge blanking circuit 315 will block the trigger signal ST and maintain it as logic low. In the embodiment shown in FIG. 5, the leading-edge blanking circuit 315 comprises a delay element DLY1 and a logic AND gate circuit AND1. The delay element DLY1 is coupled to the output terminal of the comparator CMP1 to receive the comparison signal SP and is configured to delay the comparison signal SP by the preset time period Tblank. In one embodiment, the preset time period Tblank is 200 ns~250 ns. The logical AND gate circuit AND1 has a first input terminal, a second input terminal and an output terminal, wherein the first input terminal receives the output of the delay element DLY1, the second input terminal receives the comparison signal SP, and the logical AND gate circuit AND1 provides the trigger signal ST at the output terminal.

In addition, the falling-edge trigger circuit 316 is coupled to the output terminal of the sampling circuit 314 to receive the voltage $V_{CC\text{-}SS}$, and to provide the falling-edge trigger signal FL when the falling-edge of the voltage $V_{CC\text{-}SS}$ at the power supply terminal VCC comes.

As shown in FIG. 5, the turn on enable circuit 302A comprises a sampling circuit 324, a set circuit 325, a reset circuit 326 and a trigger circuit 327. The sampling circuit 324 is coupled to the sensing terminal CS, to provide a sensing signal V1 representative of the voltage Vcs across the current sense resistor Rcs.

The set circuit 325 is configured to provide a set signal S0 having a first level when the sensing signal V1 is decreased to the first threshold voltage $V_{TH1\text{-}Hys}$ during the trigger signal ST has a first level. In the embodiment shown in FIG. 5, the set circuit 325 comprises a comparator CMP2, a logical AND gate circuit AND2, and a rising-edge trigger 328. The inverting input terminal of the comparator CMP2 is configured to receive the sensing signal V1, and the non-inverting input terminal is configured to receive the first threshold voltage $V_{TH1-Hys}$. The logic AND gate circuit AND2 has a first input terminal, a second input terminal and an output terminal, wherein the first input terminal is configured to receive the trigger signal ST provided by the logic state judgment circuit 301A, and the second input terminal is configured to receive an output signal of the comparator CMP2. The rising-edge trigger 328 is coupled to the output terminal of the logical AND gate circuit AND2 and provides the set signal S0 at the output terminal.

The reset circuit 326 is configured to provide a reset signal R0 having a turn on enable window Tw when the sensing signal V1 is increased to the second threshold voltage $V_{TH1}$. In the embodiment shown in FIG. 5, the reset circuit 326 comprises a comparator CMP3, a delay element DLY2 and a rising-edge trigger circuit 329. The non-inverting input terminal of the comparator CMP3 is configured to receive the sensing signal V1, and the inverting input terminal of the comparator CMP3 is configured to receive the second threshold voltage $V_{TH1}$, the output terminal of the comparator CMP3 is coupled to the rising-edge trigger circuit 329 through the delay element DLY2. The delay element DLY2 is configured to delay the output of the comparator CMP3. The rising-edge trigger circuit 329 is configured to provide the reset signal R0 with the turn on enable window Tw at an output terminal.

The trigger circuit 327 comprises a flip-flop FF1 and a logical OR gate circuit OR1. The flip-flop FF1 has a set terminal, a reset terminal and an output terminal, wherein the set terminal is coupled to the output terminal of the set circuit 325 to receive the set signal S0. The output terminal of the flip-flop FF1 is configured to provide an enable signal SEN. The OR gate circuit OR1 has a first input terminal, a second input terminal and an output terminal, wherein the first input terminal is configured to receive the reset signal R0, the second input terminal is configured to receive the turn on control signal S_ON, and the output terminal is coupled to the reset terminal of the flip-flop FF1.

The enable logic circuit 303A comprises a logic AND gate circuit AND3. The AND gate circuit AND3 has a first input terminal, a second input terminal and an output terminal, wherein the first input terminal is coupled to the output terminal of the logic state judgment circuit 301A to receive the falling-edge trigger signal FL, and the second input terminal is coupled to the output terminal of the enable circuit 302A to receive the enable signal SEN, and provides a turn on control signal S_ON at the output terminal.

Figure 6:
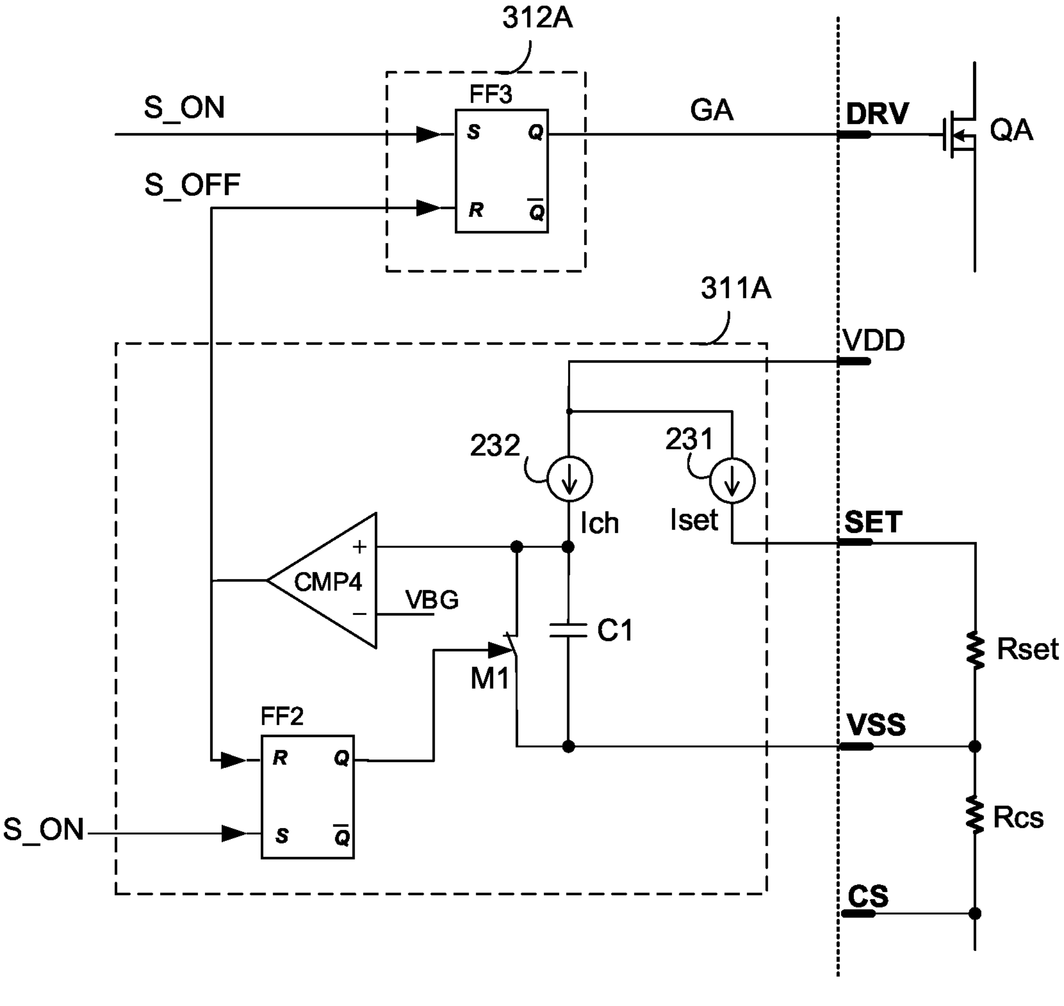
FIG. 6 shows an ON-time control circuit 311A and a logic circuit 312A in accordance with an embodiment of the present invention.

FIG. 6 shows an ON-time control circuit 311A and a logic circuit 312A in accordance with an embodiment of the present invention. The ON-time control circuit 311A is configured to provide the ON-time control signal S_OFF, to control the ON-time of the auxiliary switch QA. In the embodiment shown in FIG. 6, the ON-time control circuit 311A comprises a first current source 231, a second current source 232, a first capacitor C1, a first transistor M1, a comparator CMP4 and a flip-flop FF2.

The flip-flop FF2 has a set terminal, a reset terminal and an output terminal, wherein the set terminal is coupled to the output terminal of the turn on control circuit (such as 310A shown in FIG. 5) to receive the turn on control signal S_ON, and the reset terminal is configured to receive the ON-time control signal S_OFF.

The first current source 231 has a first terminal and a second terminal, wherein the first terminal is coupled to the voltage regulating terminal VDD, to receive the internal power supply voltage Vs, and the second terminal is coupled to the setting terminal SET, wherein the first current source 231 is configured to provide a first current Iset at the second terminal. An external resistor Rset is arranged outside the controller 31A of the auxiliary switch QA and is coupled between the setting terminal SET and the ground terminal VSS. The second current source 232 has a first terminal and a second terminal, wherein the first terminal is coupled to the voltage regulating terminal VDD to receive the internal power supply voltage Vs, the second current source 232 provides a second current Ich at the second terminal. The second current Ich is proportional to the first current Iset. The first capacitor C1 has a first terminal and a second terminal, wherein the first terminal is coupled to the second terminal of the second current source 232, and the second terminal is coupled to the ground terminal VSS. The first transistor M1 has a first terminal, a second terminal and a control terminal, wherein the first terminal is coupled to the first terminal of the first capacitor C1, the second terminal is coupled to the ground terminal VSS, and the control terminal is coupled to the output terminal of the flip-flop FF2. The comparator CMP4 has an inverting input terminal, a non-inverting input terminal and an output terminal, wherein the inverting input terminal is coupled to receive a control voltage VBG, the non-inverting input terminal is coupled to the first terminal of the first capacitor C1, and the comparator CMP4 generates the ON-time control signal S_OFF at the output terminal.

The logic circuit 312A comprises a flip-flop FF3. The flip-flop FF3 has a set terminal, a reset terminal and an output terminal, wherein the set terminal is coupled to the output terminal of the turn on control circuit 310A to receive the turn on control signal S_ON, and the reset terminal is coupled to the output terminal of the ON-time control circuit 311A, to receive the ON-time control signal S_OFF. The output terminal of the flip-flop FF3 provides the auxiliary control signal GA and is coupled to the drive terminal DRV through a drive circuit (not shown) to control the turning-on and turning-off of the auxiliary switch QA.

Figure 7:
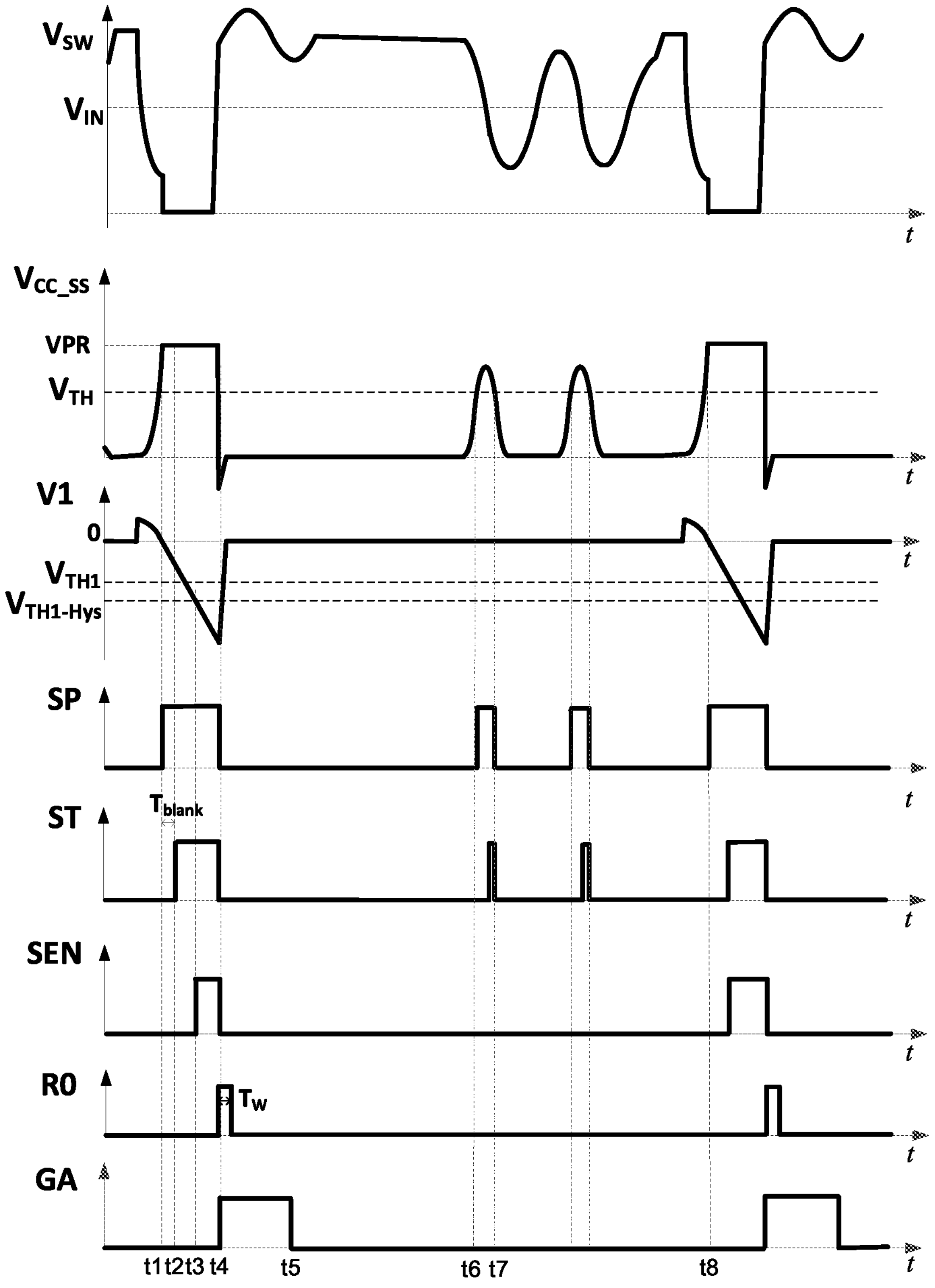
FIG. 7 shows a working waveform of a flyback circuit 300 shown in FIG. 3 in accordance with an embodiment of the present invention.

FIG. 7 shows a working waveform of a flyback circuit 300 shown in FIG. 3 in accordance with an embodiment of the present invention. As shown in FIG. 3, in the flyback circuit 300, when the primary switch QP is turned on, a current flowing though the current sense resistor Rcs gradually increases, and the voltage Vcs across the current sense resistor Rcs is generated. At the same time, the primary power supply voltage VPR provides power for the controller 31 of the auxiliary switch QA through the diode DO, thus the voltage $V_{CC-SS}$ at the power supply terminal VCC is equal to the primary power supply voltage VPR. During the free-wheeling period of the secondary side after the primary switch QP is turned off, the voltage Vcs across the current sense resistor Rcs will decrease to zero and the voltage $V_{SW}$ at the switch node starts oscillation in discontinuous current mode. Since the ground terminal VSS of the controller 31 is coupled to the switch node through the current sense resistor Rcs, and the voltage at the ground terminal VSS will follow the voltage $V_{SW}$ at the switch node and start oscillation, accordingly, the voltage $V_{CC-SS}$ at the power supply terminal VCC will also oscillate with the voltage $V_{SW}$ at the switch node.

It should be noted that in the waveforms shown in FIG. 7, the waveform of the voltage Vsw is drawn with the primary reference ground of the flyback circuit 300 as a reference ground potential. However, the waveform of the voltage $V_{CC-SS}$ at the power supply terminal VCC and the waveform of the sensing signal V1 are drawn with the reference ground VSS of the controller 31 as the reference potential.

As shown in FIG. 7, at time t1, the comparison signal SP is switched from a previous low level to a high level. At time t2, after the leading-edge of the comparison signal SP is blanked for a preset time period Tblank, the trigger signal ST changes from a low level to a high level, so as to suppress a current spike caused by the turning-on of the primary switch QP.

At time t3, while the trigger signal ST is at a high level, the sensing signal V1 decreases to the first threshold voltage $V_{TH1\text{-}Hys}$, the enable signal SEN is switched from the low level to the high level, allowing the auxiliary switch QA to be turned on when the falling-edge of the voltage $V_{CC\text{-}SS}$ at the power supply terminal VCC comes.

In the embodiment shown in FIG. 7, the falling-edge of the voltage $V_{CC\text{-}SS}$ at the power supply terminal VCC comes at time t4, the auxiliary control signal GA becomes a high level, the auxiliary switch QA is turned on, and the enable signal SEN is reset to be a low level. In addition, at time t4, the sensing signal V1 increases to the second threshold voltage $V_{TH1}$, the reset signal R0 becomes a high level, and then changes to a low level after the turn on enable window Tw ends.

At time t5, an ON-time of the auxiliary switch QA reaches the ON-time set by the on-time control circuit 311A, and the auxiliary switch QA is turned off.

At time t6, the comparison signals SP becomes high. Subsequently, although the trigger signal ST becomes a high level again, the sensing signal V1 remains at 0. And when the falling-edge of the voltage $V_{CC\text{-}SS}$ comes at time t7, since the enable signal SEN remains at a low level, the auxiliary control signal GA will not be triggered, and the auxiliary switch QA remains off. So, the mis-trigger in discontinuous current mode due to the oscillation of the switch node voltage Vsw is effectively avoided. At time t8, the primary switch QP is turned on again to enter the next switching cycle, and the above process is repeated continuously.

Figure 8:
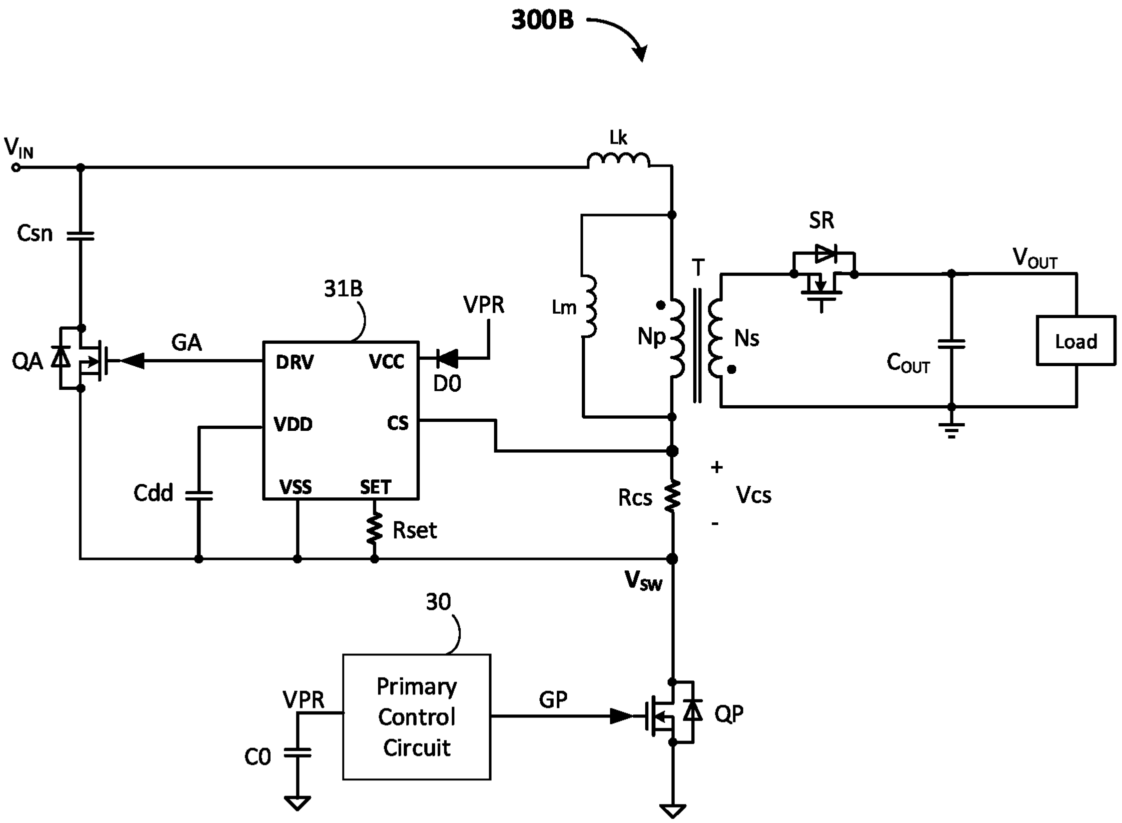
FIG. 8 shows a circuit diagram of a flyback circuit 300B in accordance with another embodiment of the present invention.

FIG. 8 shows a circuit diagram of a flyback circuit 300B in accordance with another embodiment of the present invention. Compared with the flyback circuit 300 shown in FIG. 3, the difference is that the flyback circuit 300B shown in FIG. 8 has a different connection between the controller 31B and the current sense resistor Rcs. In the embodiment shown in FIG. 8, the ground terminal VSS of the controller 31B is coupled to a common switch node of the auxiliary switch QA and the primary switch QP. the sensing terminal CS is coupled to a first terminal of the current sense resistor Rcs, the first terminal of the current sense resistor Rcs is connected to the primary winding Np. The second terminal of the current sense resistor RCS is connected to the primary switch and the ground terminal VSS. According to the embodiment shown in FIG. 8, the turning-on of the auxiliary switch QA can also be determined based on the logic state of the voltage $V_{CC\text{-}SS}$ and the voltage $V_{CS}$ across the current sense resistor Rcs.

Figure 9:
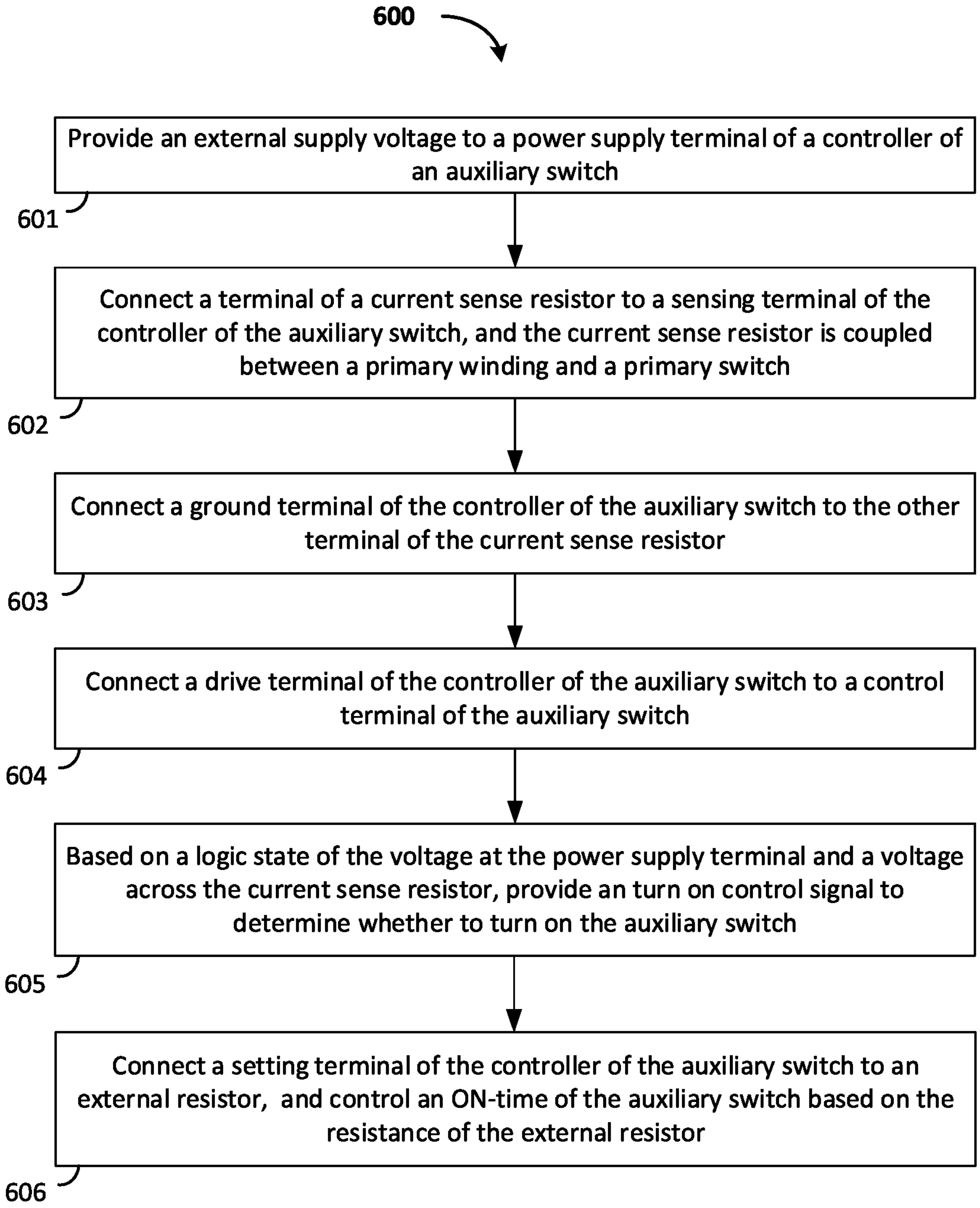
FIG. 9 shows a flow diagram of a control method 600 for controlling an auxiliary switch used in a flyback circuit in accordance with an embodiment of the present invention.

FIG. 9 shows a flow diagram of a control method 600 for controlling an auxiliary switch coupled in series with a clamp capacitor to form an energy recycle branch in a flyback circuit. As shown in FIG. 9, the control method comprises steps 601~605.

At step 601, an external power supply voltage is received at a power supply terminal of a controller. In one embodiment, the power supply terminal is configured to receive a primary power supply voltage of a primary control circuit through a diode.

At step 602, a sensing terminal of the controller is coupled to a first terminal of a current sense resistor which is connected in series with a primary switch.

At step 603, a ground terminal of the controller is coupled to a second terminal of the current sense resistor.

At step 604, a drive terminal of the controller is coupled to a control terminal of the auxiliary switch.

At step 605, based on a logic state of the voltage at the power supply terminal and a voltage across the current sense resistor, whether to turn on the auxiliary switch is determined.

In one embodiment, the control method 600 further comprises a step 606. At step 606, a setting terminal of the controller is connected to an external resistor. And an ON-time control signal is provided to limit a maximum ON-time of the auxiliary switch based on the resistance of the external resistor. In another embodiment, the turning-off of the auxiliary switch can be controlled by other solutions.

FIG. 10 shows a flow diagram of a method 605 for providing a turn on control signal in accordance with an embodiment of the present invention. In the embodiment shown in FIG. 10, the method 605 comprises steps 6051~6052.

At step 6051, a logic state of the voltage at the power supply terminal is detected.

At step 6052, a trigger signal having a first level is provided, when the duration the voltage being a logic high level is longer than a first pre-determined period.

At step 6053, a sensing signal representative of the voltage across the current sense resistor is provided.

At step 6054, an enable signal with a first level is provided when the trigger signal is being the first level and the sensing signal is decreased to a first threshold voltage.

At step 6055, the auxiliary switch is allowed to be turned on when the enable signal is being the first level and a falling-edge of the voltage at the power supply terminal comes.

In one embodiment, the method 605 further comprises steps 6056 and 6057.

At step 6056, a reset signal with a turn on enable window is provided when the sensing signal is increased to a second threshold voltage. In one embodiment, the first threshold voltage and the second threshold voltage are both less than zero and close to zero.

At step 6057, if the falling-edge of the voltage at the power supply terminal shows within the turn on enable window, the auxiliary switch is turned on after a dead time. If the falling-edge of the voltage at the power supply terminal is not shown within the turn on enable window, the enable signal is switched from the first level to a second level.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated, and they obviously will be resorted to by those skilled in the art without departing from the spirit and the scope of the invention as hereinafter defined by the appended claims as only a preferred embodiment(s) thereof has been disclosed.

What is claimed is:

1. A controller for controlling an auxiliary switch, the controller comprising:
- a power supply terminal configured to receive an external supply voltage;
- a sensing terminal configured to be coupled to a first terminal of a current sense resistor which is connected in series with a primary switch;
- a ground terminal configured to be coupled to a second terminal of the current sense resistor;
- a drive terminal configured to be coupled to a control terminal of the auxiliary switch; and
- a turn on control circuit comprising:
- a logic state judgement circuit coupled to the power supply terminal to receive a voltage at the power supply terminal, wherein when a duration the voltage at the power supply terminal being a logic high level is longer than a first pre-determined period, the logic state judgement circuit is configured to provide a trigger signal having a first level;
- a turn on enable circuit coupled to the sensing terminal of the controller to receive a sensing signal representative of a voltage across the current sense resistor, wherein when the trigger signal is being the first level and the sensing signal is decreased to a first threshold voltage, the turn on enable circuit is configured to provide an enable signal having a first level; and
- an enable logic circuit configured to allow the auxiliary switch to be turned on when the enable signal is being the first level and a falling-edge of the voltage at the power supply terminal comes.

2. The controller of claim 1, wherein the turn on enable circuit is configured to provide a reset signal having a turn on enable window when the sensing signal is increased to a second threshold voltage.

3. The controller of claim 2, wherein:
- if the falling-edge of the voltage at the power supply terminal shows within the turn on enable window, the auxiliary switch is turned on after a dead time; and
- if the falling-edge of the voltage at the power supply terminal is not shown within the turn on enable window, the enable signal is switched from the first level to a second level.

4. The controller of claim 2, wherein the first threshold voltage is less than the second threshold voltage which is less than zero and close to zero.

5. The controller of claim 2, wherein the turn on enable circuit comprises:
- a first comparison circuit configured to compare the sensing signal and the first threshold voltage and to generate a first comparison signal;
- an AND gate circuit having a first input terminal, a second input terminal and an output terminal, wherein the first input terminal is configured to receive the trigger signal, and the second input terminal is configured to receive the first comparison signal;
- a second comparison circuit configured to compare the sensing signal with the second threshold voltage, to provide a second comparison signal;
- a delay element configured to provide the reset signal by delaying the second comparison signal; and
- a flip-flop having a set terminal, a reset terminal and an output terminal, wherein the set terminal is coupled to the output terminal of the AND gate circuit, the reset terminal is configured to receive the reset signal, and the flip-flop provides the enable signal at the output terminal.

6. The controller of claim 1, further comprises a setting terminal and an ON-time control circuit coupled to the setting terminal, wherein the setting terminal is configured to be coupled to an external resistor, and the ON-time control circuit is configured to limit an ON-time of the auxiliary switch in accordance with the resistance of the external resistor.

7. A flyback circuit, comprising:
- a primary switch coupled to the primary winding of a transformer via a current sense resistor;
- an auxiliary switch coupled in series with a clamp capacitor to form an energy recycle branch; and
- a controller, configured to control the auxiliary switch, comprising:
  - a power supply terminal configured to receive an external supply voltage;
  - a sensing terminal configured to be coupled to a first terminal of the current sense resistor;
  - a ground terminal configured to be coupled to a second terminal of the current sense resistor;
  - a drive terminal configured to be coupled to a control terminal of the auxiliary switch; and
  - a turn on control circuit comprising:
  - a logic state judgement circuit coupled to the power supply terminal to receive a voltage at the power supply terminal, wherein when a duration the voltage at the power supply terminal being a logic high level is longer than a first pre-determined period, the logic state judgement circuit provides a trigger signal having a first level;
  - a turn on enable circuit coupled to the sensing terminal to receive a sensing signal representative of a voltage across the current sense resistor, when the trigger signal is being the first level and the sensing signal is decreased to a first threshold voltage, the turn on enable circuit is configured to provide an enable signal having a first level; and
  - an enable logic circuit configured to allow the auxiliary switch to be turned on when the enable signal is being the first level and a falling-edge of the voltage at the power supply terminal comes.

8. The flyback circuit of claim 7, wherein the turn on enable circuit is configured to provide a reset signal with a turn on enable window when the sensing signal is increased to a second threshold voltage.

9. The flyback circuit of claim 8, wherein:
- if the falling-edge of the voltage at the power supply terminal shows within the turn on enable window, the auxiliary switch is turned on after a dead time; and
- if the falling-edge of the voltage at the power supply terminal is not shown within the turn on enable window, the enable signal is switched from the first level to a second level.

10. The flyback circuit of claim 8, wherein the first threshold voltage is less than the second threshold voltage which is less than and close to zero.

11. The flyback circuit of claim 8, wherein the turn on enable circuit comprising:
- a first comparison circuit configured to compare the sensing signal and the first threshold voltage and to generate a first comparison signal;
- an AND gate circuit having a first input terminal, a second input terminal and an output terminal, wherein the first input terminal is configured to receive the trigger signal, and the second input terminal is configured to receive the first comparison signal;
- a second comparison circuit configured to compare the sensing signal with the second threshold voltage, to provide a second comparison signal; and
- a delay element configured to provide the reset signal by delaying the second comparison signal; and
- a flip-flop having a set terminal, a reset terminal and an output terminal, wherein the set terminal is coupled to the output terminal of the AND gate circuit, the reset terminal is configured to receive the reset signal, and the flip-flop provides the enable signal at the output terminal.

12. The flyback circuit of claim 7, further comprises a setting terminal and an ON-time control circuit coupled to the setting terminal, wherein the setting terminal is configured to be coupled to an external resistor, and the ON-time control circuit is configured to limit an ON-time of the auxiliary switch in accordance with the resistance of the external resistor.

13. A control method for controlling an auxiliary switch, and the control method comprising:
- receiving an external supply voltage at a power supply terminal of a controller;
- coupling a sensing terminal of the controller to a first terminal of a current sense resistor;
- coupling a ground terminal of the controller to a second terminal of the current sense resistor;
- coupling a drive terminal of the controller to a control terminal of the auxiliary switch;
- detecting the logic state of a voltage at the power supply terminal;
- providing a trigger signal having a first level when a duration a voltage at the power supply terminal being a logic high level is longer than a first pre-determined period;
- providing a sensing signal representative of a voltage across the current sense resistor;
- providing an enable signal with a first level when the trigger signal is being the first level and the sensing signal decreases to a first threshold voltage; and
- allowing the auxiliary switch to be turned on when the enable signal is being the first level and a falling-edge of the voltage at the power supply terminal comes.

14. The control method of claim 13, further comprising:
- providing a reset signal with a turn on enable window when the sensing signal is increased to a second threshold voltage.

15. The control method of claim 14, wherein:
- if the falling-edge of the voltage at the power supply terminal shows within the turn on enable window, the auxiliary switch is turned on after a dead time; and
- if the falling-edge of the voltage at the power supply terminal is not shown within the turn on enable window, the enable signal is switched from the first level to a second level.

16. The control method of claim 14, wherein the first threshold voltage is less than the second threshold voltage.

17. The control method of claim 14, wherein the second threshold voltage is less than and close to zero.

* * * * *